Patented July 25, 1933

1,919,602

UNITED STATES PATENT OFFICE

CHARLES M. STEWART, OF DENVER, COLORADO, ASSIGNOR TO GARDNER-DENVER COMPANY, OF DENVER, COLORADO, A CORPORATION OF DELAWARE

VALVE

Application filed July 29, 1930, Serial No. 471,458. Renewed December 5, 1932.

The present invention relates to a means for mounting the operating handles of rotary valves. It is primarily intended for use for rock drill throttle valves, though it may be used on any rotary valve.

Heretofore the operating handles of rock drill throttle valves have been fastened to the valve stem by means of a retaining nut. These retaining nuts have been a source of annoyance, due to their working loose, and as a consequence the handle becoming detached. In case the machine is being used in a muddy place, as often occurs, the handle is sometimes lost in the mud and the operator is prevented from turning the valve and stopping the tool.

The object of the present invention is to provide a mounting for a valve operating handle which does not rely on a retaining nut or other structure which may work loose, and which makes it impossible for the handle to be removed from the stem without disassembling the entire valve structure.

Another object is to provide means for reducing the vibration of the operating handle when used on a percussive instrument, such as a rock drill.

Still another object is to provide a novel structure, whereby the operating handle is held in the various positions in which it is placed by the operator, and will not work from such position by reason of vibration.

In the accompanying drawing:

Figure 1 is a top plan view of a rock drill back head, showing the throttle valve chest, valve and the preferred form of construction of handle assembly in section.

Figure 2 is a side elevation of the back head.

Figure 3 is a side view, partially in section on the line 3—3 of Figure 1.

Formed integrally with the back head 1 of a rock drill, is the valve chest 2 and a lug 3. The centers of the bores of the valve chest 2 and of the lug 3 are in line, and the lug 3 is separated from the valve chest 2 by a space 3a.

Within the valve chest 2 is a valve seat 4 that tapers toward the lug 3 and in which a tapered rotary valve 5 is seated. The end of the air supply coupling 6 is secured within the larger end of the valve chest 2 by means of a plug nut 7. A coil spring 8 abuts against the inner end of the coupling 6 and nut 7 and presses the valve 5 to its seat 4.

Extending from the smaller end of valve 5 and valve chest 2 is a valve stem 9, opposite sides of which are flattened as at 10. The valve stem 9 extends across the space 3a between the valve chest 2 and the lug 3 and engages in an opening 11 in said lug 3. In the drawing the valve stem 9 is shown as passing entirely through said lug 3, but its extension therethrough is of course not necessary.

The operating handle consists of a hub 13 and a grip portion 14 which may be of any convenient form. Through the hub portion 13 is an opening 15 of a size and shape suitable to closely engage the valve stem 9 which passes through it and prevent relative rotation of the two.

Mounted in an enlargement of the opening 11 which forms a socket 15a in the lug 3 is a coil spring 16 which bears against the hub portion 13 of the operating handle and presses the handle away from the lug 3 and tightly against the end of the valve chest 2, thus tending to prevent vibration of the handle.

Located at one side of the hub portion 13 of the operating handle, and in the drawing shown as being mounted in a socket 17 in the back of head 1, is a plunger 18 pressed outwardly by a spring 19 and which bears against the rim of the hub 13 of the operating handle and engages in indentations 20 or seats formed in the rim of hub 13 at a proper distance apart. This plunger is for the purpose of holding the operating handle and consequently the valve in either its open or closed position. The plunger is held in its socket by the hub 13 of the operating handle.

In assembling this structure, the springs 16 and 19 are slipped into their respective sockets and the plunger 17 is positioned over the spring 19. The operating handle is then placed in position in the space 3a between the lug 3 and the valve chest 2, in which position it retains the spring 16 and the plunger 17 in their proper places. The valve 5 is then placed within the valve chest 2 through the larger end of the valve seat 4, and pressed to its seat 4, the extending stem 9 passing through the opening 15 in the hub portion 13 of the operating handle, and at its outer end engaging in the opening 11 of the lug 3. Coil spring 8 is inserted, then the end of the air hose coupling 6 is introduced and held in place by the nut 7.

It will be apparent that the operating handle will then be secured upon the valve stem 9 by the lug 3 at one end and the valve chest at the other, and can be removed from the valve stem only by removing the nut 7, air hose coupling 6, coil spring 8, valve 5 and its stem 9.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In combination, a supporting structure, a valve chest having a tapered valve seat, a tapered rotary valve positioned within the valve chest, a coil spring holding the valve to its seat, a valve stem projecting from the smaller end of the valve and valve seat, an operating handle mounted upon the valve stem and slidable from the end thereof, a lug projecting from the supporting structure and in which the valve stem engages to retain the operating handle upon the valve stem, and means carried by the lug and surrounding the valve stem to prevent vibration of the operating handle thereon.

2. In combination, a supporting structure having a valve chest and a lug spaced from the valve chest, a rotary valve removably positioned within the valve chest and having a stem extending from the valve chest across the space and engaging in the lug, an operating handle movable longitudinally of the valve stem between the valve chest and the lug, a spring pressed plunger mounted at one side of the space and operating upon the handle to hold it in its different positions and held in its socket by the operating handle, and a spring supported by the stem between the lug and handle to maintain the handle in alignment with the locking means.

3. In combination, a supporting structure having a valve chest and a lug spaced therefrom, a rotary valve resiliently maintained within the valve chest and having a stem extending into the lug, an operating handle slidable upon the stem, resilient means engagable with the handle to hold the valve in various positions, and said valve when seated maintaining the handle and the locking means therefor in place.

4. In combination, a support, a valve chest thereon, an element spaced therefrom, a rotary valve resiliently maintained within the chest and having a part supported by the element, an operating handle slidable longitudinally of the valve between the chest and element, locking means carried by the support and engagable with the handle to hold the valve in various positions, resilient means positioned within the element and maintaining the handle against the valve chest and in alignment with the locking means and said valve when within the chest maintaining the handle and locking means in proper co-acting positions.

CHARLES M. STEWART.